UNITED STATES PATENT OFFICE.

RUDOLPH D'HEUREUSE, OF NEW YORK, N. Y.

PROCESS OF MALTING, BREWING, &c.

SPECIFICATION forming part of Letters Patent No. 318,548, dated May 26, 1885.

Application filed July 12, 1883. (No specimens.)

*To all whom it may concern:*

Be it known that I, RUDOLPH D'HEUREUSE, a citizen of the United States, residing at New York, in the county of New York and State of New York, have invented certain new and useful Improvements in Processes of Brewing, Malting, and other Industries, of which the following is a specification.

This invention relates to brewing, malting, and other industries, and has special reference to the frequent injurious effects resulting from the use of possibly-polluted water allowed to come in direct contact with the grain, fruit, or other material from which the products of malting, brewing, wine, glucose, or starch making and of similar operations are derived.

In the processes of malting, brewing, and the like, although conducted with the greatest care, it is found difficult, if not impossible, to secure at all times a uniform product, which shall be perfectly wholesome and palatable, free from deleterious matter, and capable of being preserved for any length of time without deterioration. It is known that the uncertainties, inconveniences, and losses incident to these manufactures were due, in great measure, to the condition of the water used, and that it is very desirable to effect the removal of the organic matter which in certain localities and at certain seasons of the year is present in the water in greater or less quantity. This matter acts upon and permeates the fruit, grain, or other material employed, and introduces into the resulting product a deteriorating influence that will sooner or later manifest itself.

The object of my invention is to obviate these dangers and uncertainties, and to insure the manufacture of a uniform pure and wholesome food product.

Various means have heretofore been resorted to for the purpose of purifying water for use in brewing and malting—such as various chemical treatments, ordinary filtration, filtration in animal charcoal, and the like. None of these processes however are efficient or can insure a reliable result, partly because they do not effectually reach the organic impurities, and partly because water, even when taken always from the same source, varies so frequently and sometimes suddenly that it would be impossible to know at a given time just what treatment the water required, without constant analysis, which, of course, would be impracticable. The filtration with animal charcoal, while it may remove some organic impurities, does not reach others, it having been ascertained, for example, that the spores of plants of low organization are not retained thereby. Protoxide of iron as a filtering medium has also been proposed; but it is an objection to all filtering processes that they cannot be implicitly relied upon, and also that unless the greatest care be exercised in removing the organic impurities the filtration is apt to make the water worse instead of better. It has also been proposed to clear the water by immersing bundles of iron wire therein, it being supposed that the iron will act upon the nitrogenous substances and ammonia, and change them by oxidation into nitrous and nitric acid; but this process, besides being obviously slow and otherwise inconvenient, is very different from that herein described, which has never before been proposed or known to be applicable to or advantageous in brewing and similar industries. My invention is based upon the discovery that if the water used in brewing, malting, and like industries be subjected to a preparatory treatment of aeration, substantially as described in my Patent No. 93,182, dated August 3, 1869, all the difficulties and objections above alluded to will be avoided and a uniformly good result produced, notwithstanding variations in the condition of the water due to change of seasons and other causes.

My invention therefore consists in intercepting the usual course of the operations of the designated industries, otherwise left substantially unchanged, by treating the water to be used, and before it is brought in contact with the grain, fruit, or other material to be operated upon, with currents of air or gas; in removing the sedimentary matter found or contained in the water; and in then bringing the grain, fruit, &c., employed in the industry in contact with water thus treated for the purpose of steeping, extracting, dissolving, diluting, or washing, according to the requirements of the respective industries, conducting their subsequent manipulations in substantially the usual manner. Accordingly the water to be used, for instance, in steeping grain for malting, is preparatively treated in a receptacle by currents of air or gas passed through the water, so as to produce an oxidizing action upon the organic matter contained in the water, if any there be, the air or gas forced into the cistern or reservoir for the water at a point preferably at or near the bottom thereof. Pipes may be used to conduct the air into the receptacle, and if found desirable may be perforated to cause a dispersion of the air-currents through the mass of the water. The cistern or receptacle which contains the water at the time may be open at the top, so that the air or gas impelled into the water may be permitted freely to escape; or the water-receptacle may be closed, and the air or gas impelled into the same, preferably near the bottom, is thus made to act under an increased pressure as high as required, the excess of air or gas escaping through a safety-valve, water-lock, or other device to control the pressure. The air, however, may be exhausted from above the surface of the water in the receptacle, and air or gas permitted to flow in at the bottom through suitable siphon-tubes. In some cases carbonic acid may be applied to the water in the manner hereinbefore set forth for applying air. This agent will assist in purifying the water by coagulating albuminous matters. In such case, however, it is generally preferable to follow the treatment of the water with carbonic acid by a further treatment with atmospheric air, to the end that by the thorough aeration all organic matter be oxidized and removed. The air used in all cases may be plain, oxygenated, or ozonized, and, if so preferred, may be filtered through cotton-wool. Where the word "gas" is herein used, it is intended to signify oxygen or ozone in connection with air or carbonic-acid gas in the connection specified. After the treatment of the water with air, as described, the insoluble matter produced in the water by the currents of air or gas, together with that previously in the water, is then allowed to deposit or may be removed by filtration, or by both filtration and deposition. The deposition of the sediment may be hastened by the addition of any convenient substance which does not prejudice the purity of the water for the purpose in view.

To apply my improvement in any of the industries in which it is of value—for instance, in brewing—the water to be used for mashing is subjected to the above-described treatment, and thus freed from organic pollution it is admitted to the mash-tun with the malt or grain and mashed in the usual manner, followed by the other usual brewing operations.

In malting, the grain is steeped in water which had been treated as above described, and in subsequent sprinkling on the malting-floors such water is with advantage employed.

In the manufacture of starch, glucose, sugar, &c., and for addition in required proportions to grape-juice or fruit in making wine or other fermented or unfermented beverages, the water brought in contact with the fruit, grain, their derivatives, or other material is likewise preparatively treated as described, and in all these and similar industries the advantages obtained by the certainty of absence from the water of organic pollution are considerable, saving great loss and inconvenience constantly occurring where water not previously so treated is employed.

Under no circumstances can the described method cause possible injury to the product, while generally of the greatest benefit.

What I claim is—

The herein-described improvement in brewing and like processes, said improvement consisting in treating the water preparatory to use in such processes by forcing air through the same, and then applying the water to the grain or other material employed, substantianly as set forth.

In testimony whereof I affix my signature in presence of two witnesses.

RUDOLPH D'HEUREUSE.

Witnesses:
B. T. BURNHAM,
GEORGE PLACE.